W. H. STEAD.
HEADLIGHT.
APPLICATION FILED DEC. 19, 1917.
1,335,081.	Patented Mar. 30, 1920
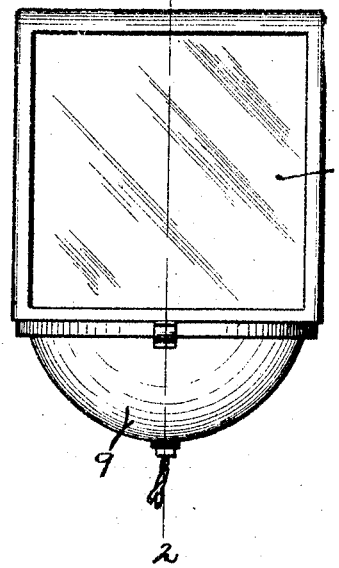
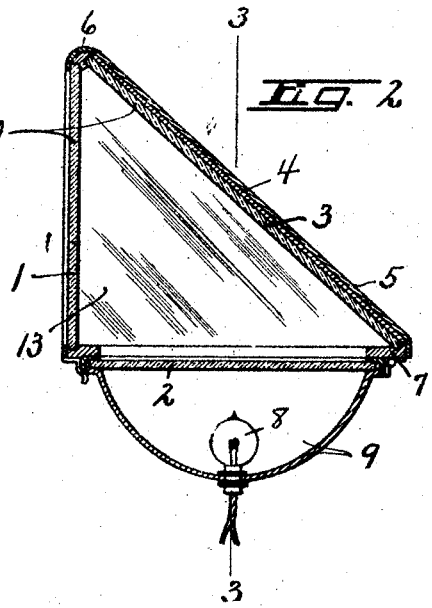
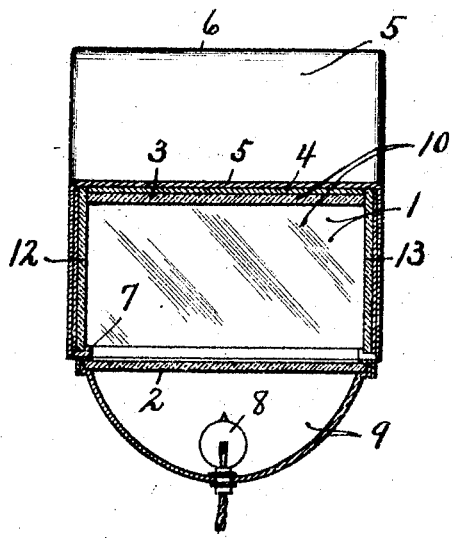
INVENTOR
W. H. Stead.
BY
Denison & Thompson
ATTORNEY

UNITED STATES PATENT OFFICE.

WILLIAM H. STEAD, OF BINGHAMTON, NEW YORK.

HEADLIGHT.

1,335,081.   Specification of Letters Patent.   Patented Mar. 30, 1920.

Application filed December 19, 1917. Serial No. 207,888.

*To all whom it may concern:*

Be it known that I, WILLIAM H. STEAD, a citizen of the United States, and resident of Binghamton, in the county of Broome, in the State of New York, have invented new and useful Improvements in Headlights, of which the following, taken in connection with the accompanying drawings, is a full, clear, and exact description.

This invention relates to certain improvements in headlights, and is particularly designed for use on moving vehicles, such as automobiles and the like.

My invention relates to the production of a headlight producing a combined spot and illuminating or diffused light, the spot or concentrated portion of the light being directed upon the road at the required distance ahead of the vehicle and the diffused or illuminating light spreading out in front of the vehicle and to the sides thereof a distance sufficient to light up all portions of the landscape adjacent the front end of the vehicle.

Other objects and advantages relate to the details of construction, as will more fully appear from the following description, taken in connection with the accompanying drawings in which—

Figure 1 is a front elevation of the headlight.

Fig. 2 is a cross section on line 2—2, Fig. 1.

Fig. 3 is a cross section on line 3—3, Fig. 2.

Fig. 4 is a view of a lens that may be utilized as hereinafter described.

The invention as shown embodies a hollow triangular casing having, in this specific illustration, a front wall —1—, a base —2—, and an inclined rear wall —3— extending from substantially the rear edge of the base —2— to the upper edge of the front —1—, all of these walls in this specific illustration being formed of glass preferably plane in form. Any suitable connections may be provided for rigidly uniting the edges of these sheets of glass to constitute the permanent casing.

Preferably the front wall —1— is movable relatively to the walls —2— and —3— to permit access to the interior of the hollow casing.

The outside surface of the rear wall —3— is covered by a sheet —4— which should be smooth in contour and substantially pure white in color. This sheet is held in place in any suitable manner, as by the backing —5— which extends over the upper edge of molding —6— and across the ring-shaped base —7—.

The artificial means for producing light is located entirely outside the hollow casing and may be, as shown, an electric bulb —8— adapted to receive electric current from any suitable source. This bulb may be adjustably supported in any suitable and well known manner upon the reflector —9— which is concave in form and has its interior surface preferably highly polished to give power and distance to the light. This reflector may be secured in any suitable manner, directly or indirectly, to the base —7— and, as shown, its edges may extend around the base —2— of the hollow triangular casing.

The operation will be readily understood. The light produced by the bulb —8— either passes directly through or is reflected through the base —2— of the hollow casing —10— and by reason of the concavity of the reflector, even though the base —2— be plano, a certain portion of the light is concentrated, thereby producing the spot of light described, and practically all of the light rays passing through the base —2— strike the inclined rear wall —3— and are reflected outwardly through the front wall —1—. The direction in which the spot is projected and the distance which it will travel in front of the headlight may be determined by variation in the inclination of the rear wall —3— and the size of the spot can be varied by adjusting the bulb —8— toward and from reflector —9—.

In certain cases, the base —2— of the hollow triangular casing may be of lenticular form, as for instance, the form shown in Fig. 4, whereby a greater concentration of the light will be produced and thereby a more powerful spot-light, but the same is not essential where a concaved reflector is used outside of and operating in connection with a plano wall of the hollow casing. In other words, by giving a lenticular power to the wall of the casing through which the light is projected, the intensity of the spot can be varied.

All of the walls of the hollow casing except the front wall —1— and the base —2— should preferably have a backing or covering of solid white, and although it may not be essential that all of the walls should have this covering, nevertheless it is quite essential that the inclined rear wall —3— should be so equipped in order to produce a clear and uniform light. The side walls —12— and —13— are preferably, as shown, formed of glass, assembled with and secured to the other parts in any suitable mechanical and well known manner.

Although I have shown and described a specific form and construction of headlight as illustrative of my invention, it will be understood that various changes and modifications may be made in the details of form, construction and arrangement without departing from the spirit of this invention as set forth in the appended claims.

What I claim is:—

1. A lamp casing comprising a transparent front wall, a transparent bottom wall, an inclined opaque substantially white rear wall extending from the top edge of the front wall to the rear edge of the bottom wall, a pair of opposite triangular substantially parallel flat white walls forming with said front, bottom and rear walls a substantially closed triangular casing, a source of light exterior of the said triangular casing and a concave reflector about the said source of light and projecting rays therefrom through the said transparent bottom wall upon the inclined opaque rear wall.

2. A lamp casing comprising a transparent front wall, a vitreous transparent bottom wall, an inclined opaque vitreous rear wall having a substantially white background, said rear wall extending from substantially the top edge of the front wall to the rear edge of the lower wall, a pair of substantially parallel side walls disposed perpendicular to the bottom wall and having a white background and forming with said front, bottom and rear walls a substantially closed triangular casing, a source of light exterior of said triangular casing and disposed adjacent the bottom wall thereof and a concave reflector about the said source of light and projecting rays therefrom through the said transparent bottom wall upon the inclined rear wall.

In witness whereof I have hereunto set my hand this 1st day of December, 1917.

WILLIAM H. STEAD.

Witnesses:
FRANK A. O'NEIL,
FREDERICK J. MEAGHER